July 7, 1959 — M. W. MARIEN — 2,893,799
CIRCUMFERENTIAL EXPANDER TYPE PISTON RING ASSEMBLY
Filed May 28, 1957 — 2 Sheets-Sheet 1
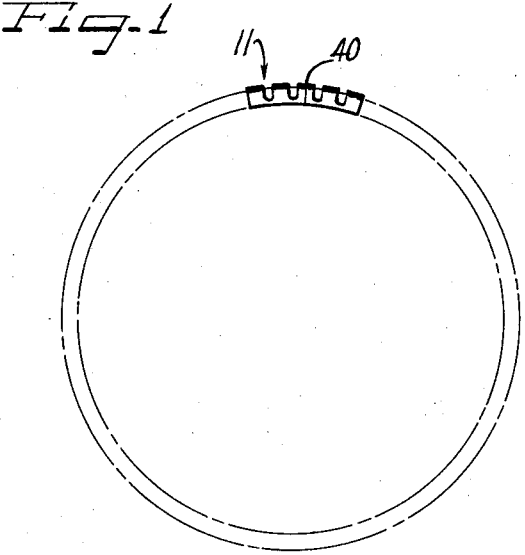
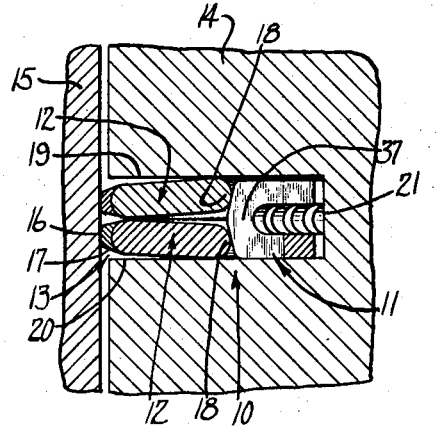
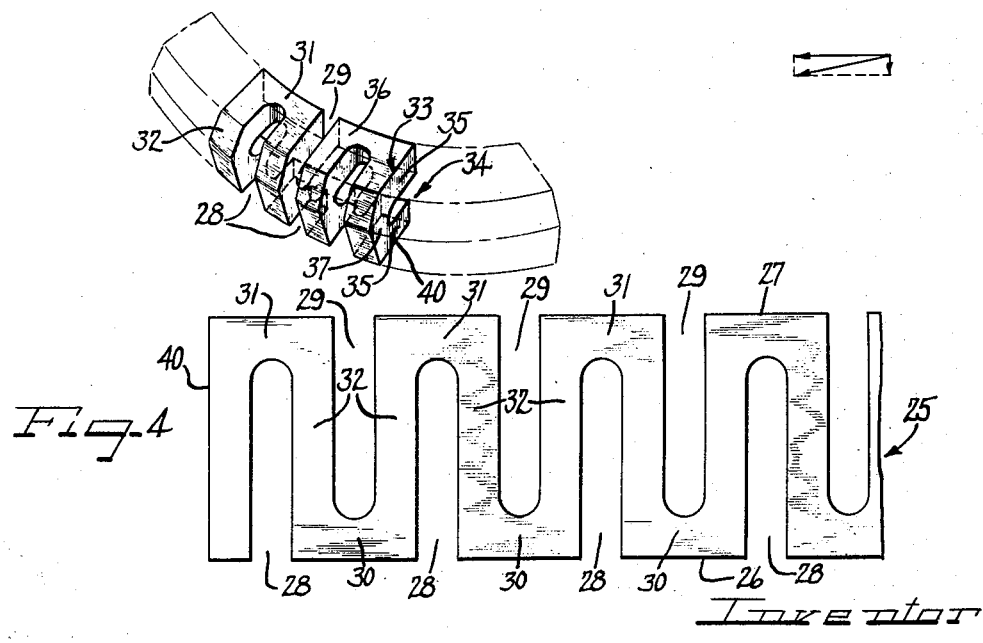
Inventor
Melvin W. Marien July 7, 1959 M. W. MARIEN 2,893,799
CIRCUMFERENTIAL EXPANDER TYPE PISTON RING ASSEMBLY
Filed May 28, 1957 2 Sheets-Sheet 2
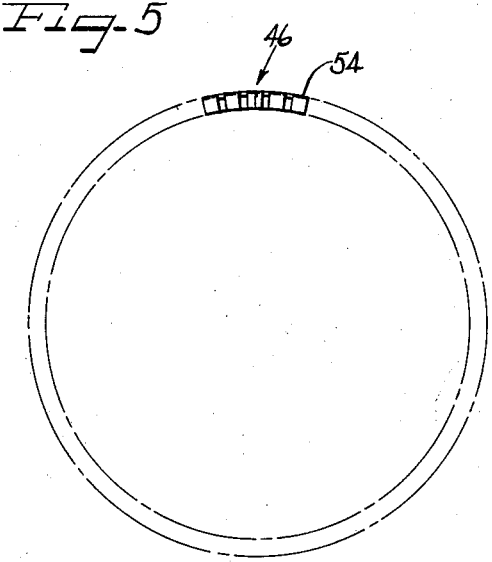
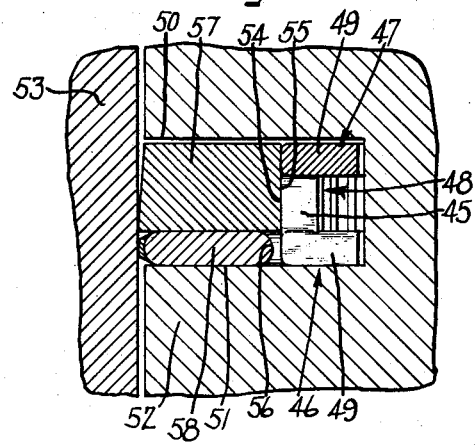
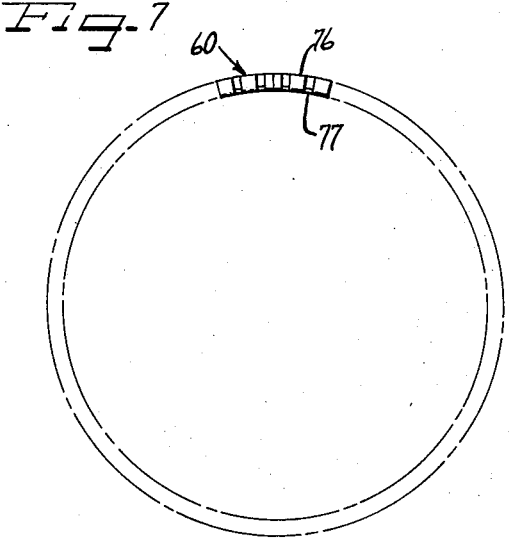
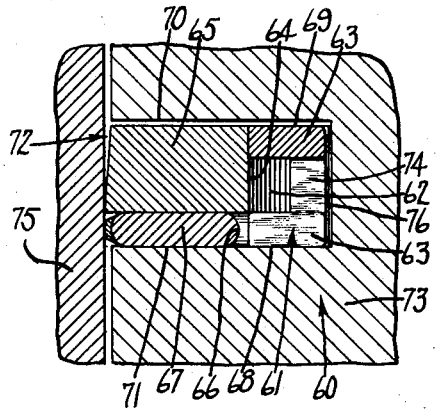
Inventor
Melvin W. Marien ID # United States Patent Office 2,893,799
Patented July 7, 1959

2,893,799

CIRCUMFERENTIAL EXPANDER TYPE PISTON RING ASSEMBLY

Melvin W. Marien, Brentwood, Mo., assignor to Ramsey Corporation, St. Louis, Mo., a corporation of Ohio Application May 28, 1957, Serial No. 662,090

8 Claims. (Cl. 309—44)

The present invention relates to a piston ring assembly, and more particularly relates to a ring assembly of the type having a circumferential expander.

Compression ratios used in modern engines have been steadily increased by the engine manufacturers. This increase has brought about a continuing need for piston ring assemblies which are more efficient than the prior rings in the prevention of blow-by, compression loss, and oil consumption. Further, increased life has also been required, which has necessitated the reduction of wear and fatigue, together with minimizing any tendency toward sticking.

In the instant invention, a ring assembly has been provided which is particularly well adapted for efficient sealing, and long reliable life. The instant invention contemplates the use of a pair of rings in the ring groove of the piston, which rings are afforded some degree of freedom so as to prevent sticking, which are provided with an expander which is continuously effective throughout the circumference of the ring, and which applies a flat-side or axial force to the rings to preclude spinning of the ring within the groove, and the resulting side wear on both the ring and the groove. The expander utilized lies entirely between the rings and the bottom of the groove and does not rely on receiving a reactive force from the bottom of the ring groove. Furthermore, the instant expander is provided with abutting ends at its points of split, which ends preclude overlapping of each other.

Accordingly, it is an object of this invention to provide a ring assembly of the expander type whereby blow-by, compression loss, and high oil consumption may be minimized.

It is also an object of this invention to provide an expander for piston rings which applies thereto an outward radial force when it is radially constrained.

A still further object of this invention is the provision of an expander ring for providing both an outward radial force and an axial force to a piston ring.

A still further object of this invention is the provision of an expander ring for lying entirely behind a piston ring wherein the ends of the expander are precluded from overlapping.

Yet another object of the instant invention is the provision of an expander which imparts dishing forces to a thin rail ring whereby side wear and vibration are minimized.

Yet another object of the instant invention is the provision of a ring assembly wherein the rings may have freedom of movement to prevent sticking, and also a biasing force to prevent undue wear.

Many other advantages, features and adidtional objects of the present invention will become manifest to those versed in the art upon making reference to the detailed description and the accompanying sheets of drawings in which several structural embodiments incorporating the principles of the present invention are shown by way of illustrative example.

On the drawings:

Figure 1 is an elevational view of an expander ring in accordance with this invention;

Figure 2 is an enlarged fragmental sectional view of a piston and cylinder illustrating the ring groove of the piston with a ring assembly therein and embodying the principles of this invention;

Figure 2a is a typical vector force diagram of the expander ring of Figure 2;

Figure 3 is an enlarged fragmental isometric illustration of the expander ring of Figure 1;

Figure 4 is an enlarged fragmental illustration of a strip of material from which the expander ring of this invention is formed;

Figure 5 is an elevational view of an expander ring of a slightly modified form;

Figure 6 is an enlarged fragmental sectional view of a piston and cylinder illustrating the ring groove of the piston with a ring assembly therein including the expander ring of Figure 5 and embodying the principles of this invention;

Figure 7 is an elevational view of still another expander ring in accordance with this invention; and Figure 8 is an enlarged fragmental sectional view of a piston and cylinder illustrating a ring groove of the piston with a ring assembly therein including the expander of Figure 7 and embodying the principles of this invention.

As shown on the drawings:

The principles of this invention are particularly useful when embodied in a piston ring assembly such as illustrated in Figure 2 which employs the expander ring shown in Figure 1. The piston ring assembly, generally indicated by the numeral 10, includes an expander means or ring 11, and a pair of sealing rings or rails 12, 12. The assembly 10 is held within a ring groove 13 of a piston 14 which is reciprocably received within a cylinder or cylinder bore 15.

The sealing rings or rails 12 may comprise any of various materials, including for example, stainless steel, nitrided "Nitralloy," and high carbon spring steel. The rails 12 have an outer periphery or face 16 which may be chrome plated if a material having a non-hardened surface is used. The outer periphery 16 may have a pair of beveled edges 17. The rails 12 each have an inner periphery 18 of a semi-circular form. For purposes of clarity, the showing in Fig. 2 has been enlarged somewhat, the actual thickness of the rails 12 being on the order of 1/32 inch in this embodiment. The upper ring 12 is engageable with an upper side 19 of the groove 13, and the lower ring 12 is engageable with a lower side 20 of the groove 13. The rings 12 are engageable with each other, particularly at their outer peripheries 16, and have an axial freedom within the groove 13. The expander ring 11 is positioned entirely behind the rings 12, intermediate the inner peripheries 18 and a bottom 21 of the groove 13.

The expander ring 11 comprises an annular member as best shown in Fig. 1, and has a central axis generally coinciding with the axes of the piston 14 and the cylinder 15. The expander member 11 has a circumferentially expansible structure comprising spring material, such as stainless steel. The radial expansibility of the structure is attained by its detailed configuration. Referring to Fig. 4, there is shown a development of the material from which the member 11 is formed. An elongated strip of resilient material 25 having a pair of opposite longitudinal edges 26 and 27 is provided with a plurality of slots 28 and 29 extending transversely thereof from the opposite edges. The slots 28 extend from the edge 26 and the slots 29 extend from the edge 27, the slots 28 being alternated with the slots 29 along the length of the strip 25. Each of these slots extends over ½ of the width of the strip 25 and therefore overlaps the adjacent slots. The structure so formed may be said to comprise a pair of series of planar longitudinal elements 30 and 31, the elements 30 spanning the space 29 between the elements 31 and the elements 31 spanning the space 28 between the elements 30. The strip also includes a plurality of planar spacing members 32 which join the ends of an element 31 to two ends of two elements 30, or which join the two ends of the elements 30 to two ends of two elements 31. The elements 30 and 31 are formed or bent with respect to the spacing elements 32 at substantially a right angle and in the same direction. The strip 25 may then be formed into an annular configuration with the elements 30, 31 positioned outwardly of the axis of the member 11, as best shown in Figs. 1 and 5, or with the elements 30 and 31 positioned inwardly, as best shown in Fig. 7. Thus, the elements 32 as a group define a tubular surface having spaced slots axially extending along such surface. Since the elements 30 and 31 are directed substantially at a right angle to the plane of the original strip 25, they are substantially parallel to each other. The spacing elements 32 may be further formed to have a convex or angular surface, as best shown in Fig. 3. Thus, viewing the expander ring as a whole, it can be seen that it comprises a member having a U-shaped radial cross-section 33, having an open end 34 which is inwardly radially directed, having a pair of legs 35, the outer surfaces of which with other legs provide a pair of substantially flat surfaces 36 for engagement with the sides 19 and 20 of the ring groove 13. The U-shape 33 thus also includes a bight portion 37 which with other bight portions defines a tubular surface. When the bight portions 37 are angled as shown in Fig. 3, the bight portions 37 together define a barrel-shaped surface, or angular surface, for bearing against the inner peripheries 18 of the rails 12. Preferably, any curve or angle imparted to the bight 37 is comparatively slight so that the bight 37 will not enter in between the rails 12. Thus also, the tubular surface has a plurality of spaced slots extending transversely or axially and also through the tubular surface.

As best seen in Figs. 1 and 4, the annular member 11 is split as indicated at the numeral 40 to provide a pair of U-shaped ends which may abut each other when the ring is assembled within the groove 13. Thus, good abutting surfaces are provided which preclude the overlapping of the ends of the expander member with each other.

Referring to Fig. 2, when the cylinder 15 reacts against the rails 12 to compress the expander ring 11, the expander ring 11 thereby provides an outward force with biases the rails 12 against the wall of the cylinder 15. Here the angular bight 37 transmits the potential force in the expander in an outward direction against the rounded ends or inner peripheries 18 of the rails 12. Since the force from the expander 11 is applied in a direction normal to the surface or normal to a tangent between such surfaces, and since such direction of force is not normal to the plane of the rings 12, such force actually comprises a pair of vector forces, the larger one acting radially outward and the smaller one acting axially to thereby urge the inner peripheries 18 against the sides 19, 20 of the groove 13. Of course, the outer ends or peripheries 16 of the rings 12 are free to engage each other. It has been found that the slight pressure or force between the rails 12 and the sides of the groove 13 prevents spinning or turning of the rails 12 and also prevents their vibration. However, it can be seen that there is substantial space in which each ring may move whereby the rings are precluded from sticking. When the forces act in the manner diagrammed in Fig. 2a, the rails 12 take on a slightly dished configuration whereby they bear against each other.

Referring to Figs. 5 and 6, a slightly modified expander ring is shown. This ring is substantially identical to the ring of Fig. 1, except that the bight 45 of the U presents a surface which is substantially parallel to the axis of the expander, generally indicated at 46. Thus, the expander 46 has a U-shaped radial cross-section 47, which has an open end 48 radially inwardly directed. The U-shape 47 includes pairs of legs 49 which define a pair of substantially parallel surfaces for engaging the sides 50 and 51 of a piston 52 reciprocably carried within a cylinder 53. The respective bights 45 collectively define a tubular surface 54 for engaging the inner peripheries 55 and 56 of a pair of rings 57 and 58 associated therewith. In the assembly shown in Fig. 6, the steel ring 57 wears away first during the break-in period so as to enable the expander 46 to subsequently engage the cast iron ring 58.

Referring to Figs. 7 and 8, a further slightly modified form of expander ring is shown. The form shown in Fig. 7 is made from the same blank of material as is the form shown in Fig. 5. However, the U-shaped material has been reversely formed so that the open end of the U, in place of being inwardly directed, is outwardly directed. Thus, the expander member generally indicated at 60 also has a U-shaped radial cross-section 61 which has an open end 62 which is radially outwardly directed. The U-shape includes a pair of legs 63, 63 each of which are radially outwardly directed for engagement with the inner peripheral edge 64 of a ring 65 and an inner peripheral edge 66 of a ring 67, the rings 65 and 67 being similar to the rings 57 and 58. Thus, the legs 63 each define generally flat and parallel surfaces 68 and 69 for engagement with a pair of sides 70 and 71 of a ring groove 72 of a piston 73 which is reciprocably carried within a cylinder 75. Thus, the U-shape 61 has a bight 74 which if revolved about the axis of the expander would define a surface of revolution having a pair of tubular surfaces 76 and 77. Thus, when the rings 65 and 67 are constrained by the cylinder 75, the expander 60 applies an outward radial force against the rings 65, 67.

It is to be understood that while the expander ring and ring assembly have been described in conjunction with engine type of pistons and more particularly as a compression ring assembly, such description is by way of illustration and not by way of limitation. Accordingly, the rings and ring assembly provided in accordance with this invention may also be utilized as oil rings and also utilized in other piston and cylinder structures, including but not limited to those found in hydraulic and pneumatic components.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. An expander ring for providing biasing forces to the sealing rings in a ring groove of a piston reciprocably disposed in a cylinder, comprising, a split annular member having a series of U-shaped radial cross-sections; the open end of the U being inwardly directed; the legs of the U-shaped sections defining a pair of substantially flat parallel oppositely directed surfaces each adapted to engage the sides of the ring groove; and the bights of the U-shaped sections jointly defining a generally tubular surface for engaging the sealing rings; said tubular surface having a plurality of spaced slots extending transversely thereof and therethrough, one end of each of said slots further extending alternately through said parallel surfaces; whereby when said ring is radially constrained, it provides an outward radial force.

2. An expander ring for providing biasing forces to the sealing rings in a ring groove of a piston reciprocably disposed in a cylinder, comprising, a split annular member having a series of U-shaped radial cross-sections; the open end of the U being inwardly directed; the legs of the U-shaped sections defining a pair of substantially flat parallel oppositely directed surfaces each adapted to engage the sides of the ring groove; and the bights of the U-shaped sections jointly defining a generally barrel shaped camming surface for engaging the sealing rings;

said tubular surface having a plurality of spaced slots extending transversely thereof and therethrough, one end of each of said slots further extending alternately through said parallel surfaces; whereby when said ring is radially constrained, it provides an outward radial force.

3. A piston ring assembly for a ring groove in a piston comprising, a pair of cylinder engaging rails, each one engageable with a side of the groove, and with each other; and an expander means lying entirely behind said rails in spaced relation to the bottom of the grooves; said expander means having a U-shaped radial cross-section and being split to provide a pair of ends which abut each other and which are precluded from overlapping each other; said U-shape being radially directed and engageable with said rails, whereby, when said expander means is constrained, said rails are outwardly urged thereby.

4. A piston ring assembly for a ring groove in a piston comprising, a pair of cylinder engaging rails, each one engageable with a side of the groove, and with each other; and an expander means lying entirely behind said rails in spaced relation to the bottom of the groove; said expander means having a U-shaped radial cross-section and being split to provide a pair of ends which abut each other and which are precluded from overlapping each other; the bight end of said U being radially outwardly directed for engagement with said rails, whereby, when said expander means is constrained, said rails are outwardly urged thereby.

5. A piston ring assembly for a ring groove in a piston comprising, a pair of cylinder engaging rails, each one engageable with a side of the groove, and with each other; and an expander means lying entirely behind said rails in spaced relation to the bottom of the groove; said expander means having a U-shaped radial cross-section and being split to provide a pair of ends which abut each other and which are precluded from overlapping each other; the legs of said U being radially outwardly directed for individual engagement with said rails, whereby, when said expander means is constrained, said rails are outwardly urged thereby.

6. A piston ring assembly for a ring groove in a piston comprising, a pair of cylinder engaging rails, each one engageable with a side of the groove, and with each other; and an expander means lying entirely behind said rails in spaced relation to the bottom of the groove; said expander means having a U-shaped radial cross-section and being split to provide a pair of ends which abut each other and which are precluded from overlapping each other; the bight end of said U being radially outwardly directed and including portions bearing at an angle to said rails against the inner peripheries of said rails to cause said rails to dish so that their inner peripheries bear against the sides of the ring groove, their outer peripheries being free to engage each other, and to force said rails outward radially for cylinder engagement.

7. A piston ring assembly for a ring groove in a piston comprising, a pair of cylinder engaging rails, each one engageable with a side of the groove, and with each other; and an expander means lying entirely behind said rails in spaced relation to the bottom of the groove; said expander means comprising a circumferentially expansible structure, U-shaped in radial cross-section, with the bight of the U extending outwardly against the inner peripheries of said rails at an angle to exert an expanding force having axially outward and radially outward force vectors.

8. An expander ring for providing biasing forces to the sealing rings in a ring groove of a piston reciprocably disposed in a cylinder, comprising, a split annualar member having a U-shaped radial cross-section; said member comprising a circumferentially expansible structure U-shaped in radial cross-section, with the bight of the U extending outwardly for engaging the inner peripheries of the sealing rings; the bight of the U being angular with respect to the axis of said member; whereby said member may provide an expanding force having axially outward and radially outward force vectors.

References Cited in the file of this patent
UNITED STATES PATENTS

| | | |
|---|---|---|
| 2,695,825 | Estey | Nov. 30, 1954 |
| 2,713,527 | Hsia-Si-Pien | July 19, 1955 |
| 2,729,524 | Prasse | Jan. 3, 1956 |